(12) United States Patent
Sumikawa

(10) Patent No.: US 11,391,378 B2
(45) Date of Patent: Jul. 19, 2022

(54) BUTTERFLY VALVE

(71) Applicant: EAGLE INDUSTRY CO., LTD., Tokyo (JP)

(72) Inventor: Daiki Sumikawa, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 315 days.

(21) Appl. No.: 16/603,408

(22) PCT Filed: Mar. 30, 2018

(86) PCT No.: PCT/JP2018/013575
§ 371 (c)(1),
(2) Date: Oct. 7, 2019

(87) PCT Pub. No.: WO2018/190148
PCT Pub. Date: Oct. 18, 2018

(65) Prior Publication Data
US 2020/0041003 A1    Feb. 6, 2020

(30) Foreign Application Priority Data

Apr. 10, 2017   (JP) .............................. JP2017-077558

(51) Int. Cl.
*F16J 15/43*   (2006.01)
*F16C 19/06*   (2006.01)
*F16C 33/76*   (2006.01)

(52) U.S. Cl.
CPC .............. *F16J 15/43* (2013.01); *F16C 19/06* (2013.01); *F16C 33/76* (2013.01)

(58) Field of Classification Search
CPC .... F16J 15/00; F16J 15/16; F16J 15/50; F16J 15/52; F16J 15/40; F16J 15/43;
(Continued)

(56) References Cited

U.S. PATENT DOCUMENTS 8,876,394 B2 * 11/2014 Ohba .................... F02D 9/106
384/484
9,222,516 B2 * 12/2015 Furukoshi ........... F16C 33/7823
(Continued)

FOREIGN PATENT DOCUMENTS

CN    203906831 U   * 10/2014
CN    203906831 U     10/2014
(Continued)

OTHER PUBLICATIONS

Taiwanese Notice of Examination Opinion dated Feb. 18, 2020 (corresponding to TW 107111645), with English translation.
(Continued)

*Primary Examiner* — Nathan Cumar
(74) *Attorney, Agent, or Firm* — Harness, Dickey & Pierce, P.L.C.

(57) ABSTRACT

A butterfly valve that is capable of reducing torque and improves sealing performance. The butterfly valve 10 includes a shaft member 100, a tabular valve body that is provided on the shaft member 100, a case 310 that is attachable to and detachable from a through-hole 510 formed in an attachment member 500 to which the butterfly valve 10 is configured to be attached, a pair of bearings 320 that is provided in the case 310 and rotatably supports the shaft member 100, and a magnetic fluid seal that is provided between the pair of bearings 320 in the case 310 and seals an annular gap between the case 310 and the shaft member 100.

2 Claims, 4 Drawing Sheets

(58) Field of Classification Search
CPC .......... F16C 19/00; F16C 19/02; F16C 19/04; F16C 19/06; F16C 19/08; F16C 33/00; F16C 33/76; F16C 33/761; F16C 33/762; F16C 33/763; F16C 33/765
USPC ........................................................ 277/410
See application file for complete search history.

(56) References Cited

U.S. PATENT DOCUMENTS

| | | | |
|---|---|---|---|
| 2014/0312258 A1* | 10/2014 | Kato | ................ F02M 35/10065 |
| | | | 251/306 |
| 2016/0312899 A1 | 10/2016 | Shimazaki | |

FOREIGN PATENT DOCUMENTS

| | | | |
|---|---|---|---|
| CN | 205806515 U | * | 12/2016 |
| CN | 205806515 U | | 12/2016 |
| JP | S52-051114 A | | 4/1977 |
| JP | H04-004367 A | | 1/1992 |
| JP | H08-270803 A | | 10/1996 |
| JP | 2009-058037 A | | 3/2009 |
| JP | 2013-124719 A | | 6/2013 |
| JP | 2015-121263 A | | 7/2015 |

OTHER PUBLICATIONS

Japanese Office Action dated Oct. 12, 2021 (corresponding to JP 2019-512427).

* cited by examiner

BUTTERFLY VALVE

CROSS-REFERENCE TO RELATED APPLICATIONS

This application is a National Stage of International Application No. PCT/JP2018/013575, filed Mar. 30, 2018 (now WO 2018/190148A1), which claims priority to Japanese Application No. 2017-077558, filed Apr. 10, 2017. The entire disclosures of each of the above applications are incorporated herein by reference.

FIELD

The present disclosure relates to a butterfly valve for opening and closing a channel.

BACKGROUND

Butterfly valves that open and close channels have been conventionally used for control of a flow rate of fluid, etc. A butterfly valve according to a conventional example will be explained with reference to FIG. 4. FIG. 4 illustrates a schematic sectional view showing main components in the butterfly valve according to the conventional example.

A butterfly valve 800 according to the conventional example includes a shaft member 810 and a valve body 820 provided in the shaft member 810. This butterfly valve 800 is attached to an attachment member 500X in a state in which the shaft member 810 is inserted through a through-hole 510X formed in the attachment member 500X to which the butterfly valve 800 is attached. The shaft member 810 is rotatably supported by a pair of bearings (ball bearings) 830. An annular gap between the through-hole 510X formed in the attachment member 500X and the shaft member 810 is sealed by a seal ring 840 provided slidably with respect to the outer circumferential surface of the shaft member 810.

Sliding between the seal ring 840 and the shaft member 810 of the butterfly valve 800 may cause torque due to sliding resistance to be generated. In addition, a sealing performance may be deteriorated due to sliding wear of the seal ring 840, and waste caused by wear may enter an apparatus.

An assembler of the apparatus performs assembly work of the bearing 830, the seal ring 840, and the like, while a manufacturer manufactures and sells the seal ring 840 and the butterfly valve 800. Thus, quality management of the seal ring 840 and the butterfly valve 800 is up to the assembler because the manufacturer is not involved with the quality management.

CITATION LIST

Patent Literature

[PTL 1] Japanese Patent Application Laid-open No. 2013-124719

SUMMARY

Technical Problem

The present disclosure provides a butterfly valve that is capable of reducing torque and enables a manufacturer, which manufactures and sells the butterfly valve, to implement management on qualities such as a sealing performance.

Solution to Problem

One aspect of the present disclosure includes the following means.

That is, one aspect of the present disclosure is a butterfly valve configured to open and close a channel, the butterfly valve including: a shaft member; a tabular valve body that is provided on the shaft member and is configured to open and close the channel with rotation of the shaft member; a case attachable to and detachable from a through-hole formed in an attachment member to which the butterfly valve is configured to be attached; a pair of bearings that is provided in the case and rotatably supports the shaft member; and a magnetic fluid seal that is provided between the pair of bearings in the case and seals an annular gap between the case and the shaft member.

The annular gap between the case and the shaft member in the above described butterfly valve is sealed by the magnetic fluid seal. Thus, torque can be reduced. In addition, the shaft member on which the valve body is provided, the pair of bearings, and the magnetic fluid seal are provided in the case. The case is configured to be attached to and detached from the through-hole formed in the attachment member to which the butterfly valve is configured to be attached. Therefore, a manufacturer that manufactures and sells the butterfly valve can implement quality management such as a sealing performance.

The valve body may be attachable to and detachable from the shaft member.

Advantageous Effects of the Disclosure

The above described butterfly valve can reduce torque. In addition, a manufacturer that manufactures and sells the butterfly valve can implement quality management such as a sealing performance.

DRAWINGS

DETAILED DESCRIPTION

A mode for carrying out the present disclosure is illustratively explained in detail below based on an embodiment with reference to the drawings. However, dimensions, materials, shapes, relative disposition, and the like of components described in this embodiment are not meant to limit the scope of the present disclosure to only those disclosed in examples unless specifically described otherwise.

Embodiment

Figure 1:
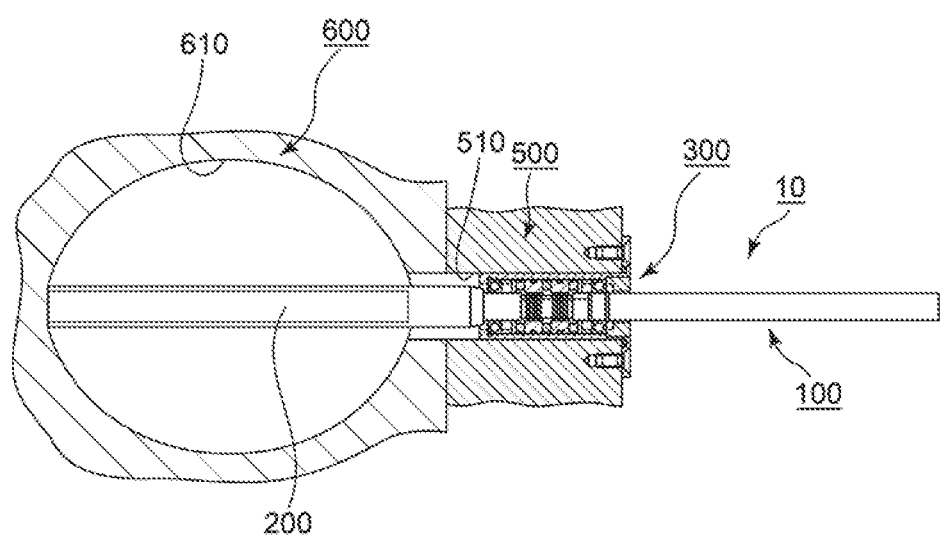
FIG. 1 illustrates a schematic sectional view showing a state of use of a butterfly valve according to an embodiment of the present disclosure.
Figure 2:
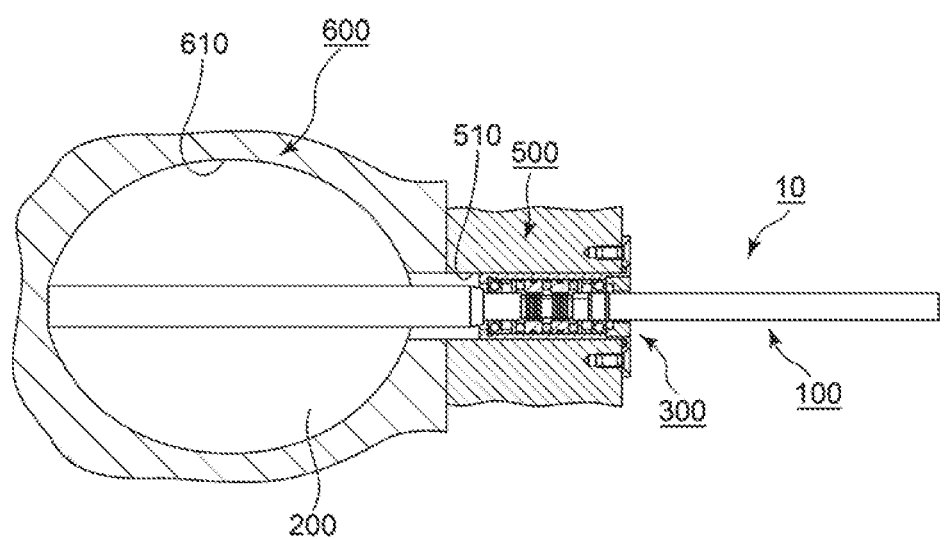
FIG. 2 illustrates a schematic sectional view showing a state of use of the butterfly valve according to the embodiment.
Figure 3:
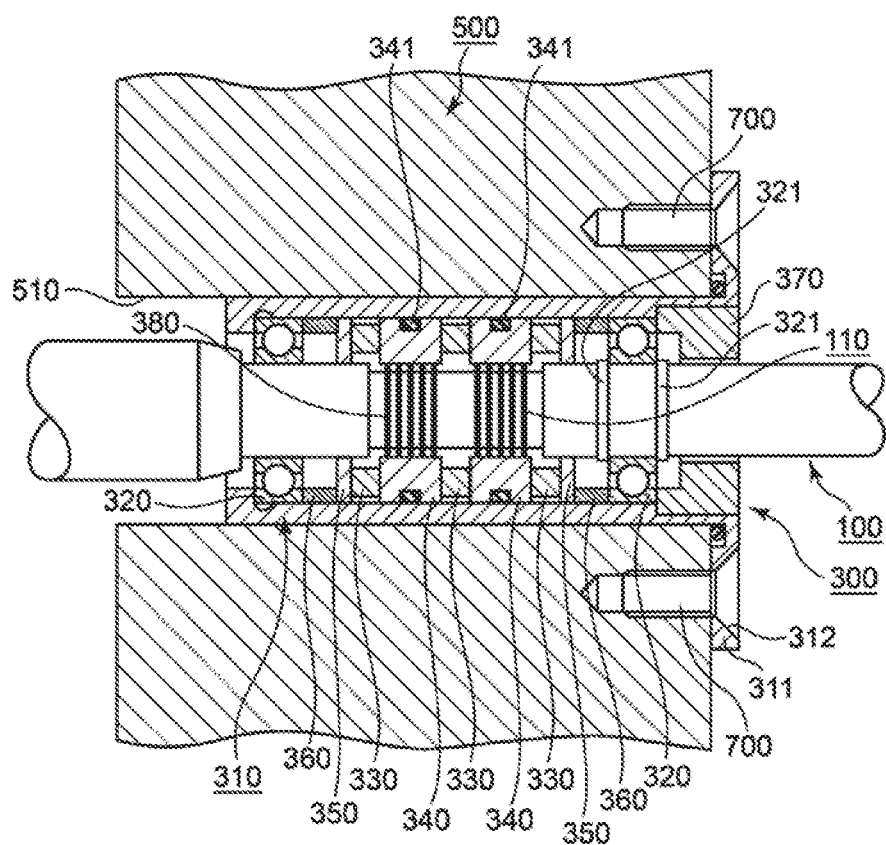
FIG. 3 illustrates an enlarged sectional view of the vicinity of a magnetic fluid seal according to the embodiment.
Figure 4:
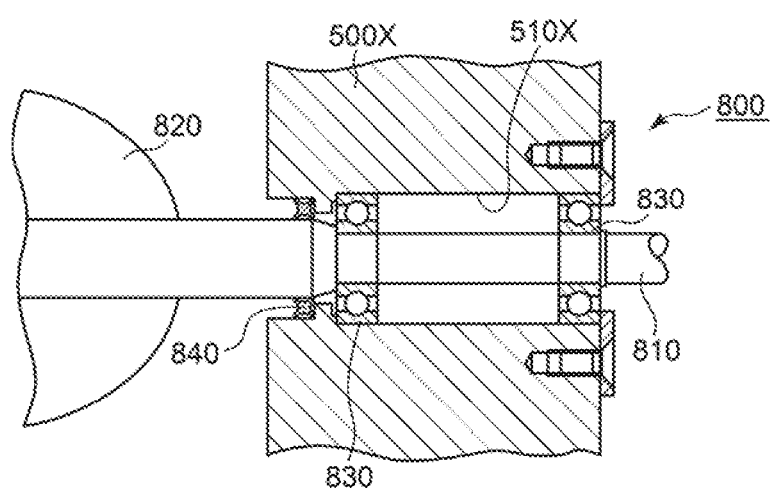
FIG. 4 illustrates a schematic sectional view showing main components in a butterfly valve according to a conventional example.

A butterfly valve according to an embodiment of the present disclosure is explained below with reference to FIG. 1 to FIG. 3. FIG. 1 and FIG. 2 are schematic sectional views showing states of use of the butterfly valve according to the embodiment of the present disclosure. FIG. 1 shows a state in which the valve is open. FIG. 2 shows a state in which the valve is closed. FIG. 1 and FIG. 2 illustrate sectional views taken along a plane including a center axis of a shaft member in the vicinity of a magnetic fluid seal. FIG. 3 illustrates a sectional view of the vicinity of the magnetic fluid seal according to the embodiment of the present disclosure, which illustrates an enlarged view of FIG. 1 and FIG. 2 in the vicinity of the magnetic fluid seal.

Overall Configuration of the Butterfly Valve

An overall configuration of a butterfly valve 10 according to this embodiment is explained with reference to FIG. 1 and FIG. 2. The butterfly valve 10 can be used for, for example, controlling a flow rate of fluid flowing in a channel. The butterfly valve 10 is used in order to control a flow rate of the fluid by opening and closing a channel 610 in an apparatus 600. The butterfly valve 10 is configured to be attached to an attachment member 500. The attachment member 500 is attachable to and detachable from the apparatus 600 by fixtures (not shown in FIG. 1 and FIG. 2) such as bolts.

The butterfly valve 10 includes a shaft member 100, a tabular valve body 200 provided in the shaft member 100, and a magnetic fluid seal unit 300. The tabular valve body 200 is attachable to and detachable from the shaft member 100 by fixtures (not shown in FIG. 1 and FIG. 2) such as bolts. The magnetic fluid seal unit 300 is attachable to and detachable from a through-hole 510 formed in the attachment member 500. When the shaft member 100 of the butterfly valve 10 rotates, the valve body 200 also rotates. The channel 610 provided in the apparatus 600 thereby opens and closes. FIG. 1 shows a state in which an opening area in the channel 610 is the largest. FIG. 2 shows a state in which the channel 610 is closed.

Magnetic Fluid Seal Unit

The magnetic fluid seal unit 300 is explained more in detail with reference to, in particular, FIG. 3. The magnetic fluid seal unit 300 includes a case 310, a pair of bearings (ball bearings) 320 that is provided in the case 310 and rotatably supports the shaft member 100, and a magnetic fluid seal that seals an annular gap between the case 310 and the shaft member 100. The bearing 320 disposed on an inlet side of the case 310 is fixed in a positioned state by a pair of retaining members 321. The magnetic fluid seal is provided between the pair of bearings 320 in the case 310.

The magnetic fluid seal includes three annular permanent magnets 330. An annular first magnetic pole member 340 is provided between each pair of the permanent magnets 330 adjacent to each other. At two portions on the outer circumferential surface side of the first magnetic pole members 340, O-rings 341 that seal annular gaps between the first magnetic pole members 340 and the case 310 are respectively disposed. Annular second magnetic pole members 350 are respectively provided on the outer sides of the permanent magnets 330 on each end. Further, spacers 360 are respectively provided between the bearings 320 and the second magnetic pole members 350 in two places. Besides, a stopper 370 for restricting movement of various members in the case 310 is provided on the inlet side of the case 310.

A plurality of annular projecting sections 110 are provided in the shaft member 100. Magnetic fluid 380 is retained by a magnetic force respectively in annular gaps between this plurality of annular projecting sections 110 and the first magnetic pole members 340.

The case 310 is provided with an outward flange 311 on the inlet side. Various members are inserted into the case 310 through the inlet. The outward flange 311 is provided with a plurality of taper-like through-holes 312 at intervals in the circumferential direction. Heads of bolts 700 abut the outward flange 311.

An assembly procedure of the butterfly valve 10 will be explained. First, the shaft member 100 is inserted into the case 310. The bearings 320, the retaining members 321, the permanent magnets 330, the first magnetic pole members 340, the O-rings 341, the second magnetic pole members 350, the spacers 360, and the stopper 370 are installed in the case 310. These various members are installed in the case 310 in order from the member on the left side in FIG. 3 through the inlet on the right side of the case 310 in FIG. 3. A male screw is provided in the stopper 370. The male screw is screwed in a female screw provided in the case 310, whereby the stopper 370 is fixed. The various members are fixed in a positioned state in the case 310. At least the assembly process explained above is performed in a manufacturer that manufactures and sells the butterfly valve 10 and the magnetic fluid seal.

Then, the butterfly valve 10 is attached to the attachment member 500. Specifically, the case 310 is inserted into the through-hole 510 formed in the attachment member 500. The case 310 is fixed to the attachment member 500 by the bolts 700. The case 310 is inserted from the right side to the left side in FIG. 3. Thereafter, the valve body 200 is fixed to the shaft member 100.

In a case where the manufacturer that manufactures and sells the butterfly valve 10 and the magnetic fluid seal manufactures the attachment member 500, the manufacturer implement also the assembly process of the attachment member 500, the butterfly valve 10, and the magnetic fluid seal.

Advantages of the Butterfly Valve

Torque can be reduced because the annular gap between the case 310 and the shaft member 100 is sealed by the magnetic fluid seal. Issues caused by sliding wear in a conventional sealing can be reduced because sliding wear can be suppressed. Further, a manufacturer that manufactures and sells the butterfly valve 10 can implement quality management such as a sealing performance because the case 310, in which the shaft member 100 having the valve body, the pair of bearings 320, and the magnetic fluid seal are provided, is attachable to and detachable from the through-hole 510 formed in the attachment member 500 to which the butterfly valve 10 is attached.

REFERENCE SIGNS LIST

10 Butterfly valve
100 Shaft member
110 Annular projecting section
200 Valve body
300 Magnetic fluid seal unit
310 Case
311 Outward flange
312 Through-hole
320 Bearing
321 Retaining member
330 Permanent magnet 340 Magnetic pole member
341 O-ring
350 Magnetic pole member
360 Spacer
370 Stopper
380 Magnetic fluid
500 Attachment member
510 Through-hole
600 Apparatus
610 Channel
700 Bolt

The invention claimed is:

1. A butterfly valve configured to open and close a channel, the butterfly valve comprising:
   a shaft member;
   a tabular valve body that is provided on the shaft member and is configured to open and close the channel with rotation of the shaft member;
   a case attachable to and detachable within an annular gap formed between a through-hole formed in an attachment member and the shaft member;
   a pair of bearings that is provided in the case and rotatably supports the shaft member; and
   a magnetic fluid seal that is provided between the pair of bearings in the case and seals an annular gap between the case and the shaft member;
   wherein the magnetic fluid seal includes:
      a plurality of annular permanent magnets;
      an annular first magnetic pole member provided between a pair of the permanent magnets adjacent to each other;
      annular second magnetic pole members respectively provided on the outer sides of the permanent magnets on each end; and
      magnetic fluid retained in annular gaps between a plurality of annular projecting sections provided in the shaft member and the first magnetic pole member.

2. The butterfly valve according to claim 1, wherein the tabular valve body is attachable to and detachable from the shaft member.

* * * * *